United States Patent
Ruiz

(10) Patent No.: US 7,471,000 B1
(45) Date of Patent: Dec. 30, 2008

(54) PORTABLE BATTERY CHARGER POWERED BY INTERNAL COMBUSTION ENGINE

(76) Inventor: Rafael J. Ruiz, 4122 W. FM 476, Poteet, TX (US) 78065

( * ) Notice: Subject to any disclaimer, the term of this patent is extended or adjusted under 35 U.S.C. 154(b) by 429 days.

(21) Appl. No.: 11/410,619

(22) Filed: Apr. 25, 2006

(51) Int. Cl.
*H02J 7/00* (2006.01)
*H02J 9/00* (2006.01)

(52) U.S. Cl. .................... 290/1 A; 290/50; 320/105
(58) Field of Classification Search ............. 290/1 A, 290/7, 8, 41, 40 C, 50; 320/104, 105
See application file for complete search history.

(56) References Cited

U.S. PATENT DOCUMENTS

| | | | | |
|---|---|---|---|---|
| 4,161,682 A | * | 7/1979 | Corvette | 320/105 |
| 4,777,397 A | | 10/1988 | Parshall | |
| 4,902,955 A | * | 2/1990 | Manis et al. | 320/105 |
| 5,077,513 A | | 12/1991 | Dea et al. | |
| 5,083,076 A | | 1/1992 | Scott | |
| 5,111,127 A | * | 5/1992 | Johnson | 320/101 |
| 5,220,268 A | | 6/1993 | Rose et al. | |
| 5,574,622 A | * | 11/1996 | Brown | 361/625 |
| 5,796,190 A | | 8/1998 | Takeda et al. | |
| 5,965,999 A | * | 10/1999 | Frank | 322/1 |
| 5,998,961 A | | 12/1999 | Brown | |
| 6,084,313 A | * | 7/2000 | Frank | 290/40 C |
| 6,603,233 B2 | | 8/2003 | Strohm | |
| 6,679,212 B2 | * | 1/2004 | Kelling | 123/179.28 |
| 6,750,556 B2 | * | 6/2004 | Sodemann et al. | 290/1 A |
| 6,801,425 B2 | * | 10/2004 | Buck et al. | 361/625 |
| 6,833,683 B2 | | 12/2004 | Winkler | |
| 7,161,253 B2 | * | 1/2007 | Sodemann et al. | 290/1 A |

OTHER PUBLICATIONS

SJ Discount Tools.com; Solar 1670- Wheeled battery Charger/ Starter; www.sjdiscounttools.com/sol1670.html, date unknown.

* cited by examiner

*Primary Examiner*—Nicholas Ponomarenko
(74) *Attorney, Agent, or Firm*—Kammer Browning PLLC

(57) ABSTRACT

A portable battery charger that is powered by a gasoline, diesel, or propane engine. The portable device incorporates a recoil or electric starter and an engine throttle lever that can be used to vary the RPM of the engine and therefore the voltage/ current output of the charger. The charger uses a permanent magnet alternator equipped with a belt tension adjustor arm and a heavy duty diode rectifier. The components of the charger (the engine and the alternator) are positioned on a wheeled, heavy-gauge steel, roll around cart that makes the charger easily portable. The two-wheeled cart includes an extended handle, allowing the user to move and steer the charger into position for use. Positioned on this handle is a control box with an anti-spark keyed switch that blocks any charging current from traveling through the charging cables until the switch is thrown. This control facilitates the safe hook-up of the charging clamps while the charger (engine) is running. The charger includes heavy duty cables between the alternator and the anti-spark control box, and additionally out from the control box to insulated clamps that are used to connect to the batteries. The control box additionally includes an ammeter and a voltmeter to indicate the charging current and voltage. The portable charger structured in this manner can be used to charge a non-specific number of batteries in parallel, typically in less than 2-4 hours depending on the size and state of the existing battery charge. The charger may also be used in the process of equalizing a bank of batteries to facilitate a reduction in stratification and sulfation.

17 Claims, 4 Drawing Sheets

PORTABLE BATTERY CHARGER POWERED BY INTERNAL COMBUSTION ENGINE

BACKGROUND OF THE INVENTION

1. Field of the Invention

The present invention relates generally to portable devices for charging electrical storage cells (batteries). The present invention relates more specifically to a portable, wet cell battery charger, powered by an internal combustion engine, the charger utilizing a high-efficiency permanent magnet alternator/generator connected through a cut-off switch to battery clamps or clips that may be attached to the terminals of a bank of batteries.

2. Description of the Related Art

Batteries or electric storage cell devices are commonly used to provide electrical power to a variety of devices in environments where alternating current electric power sources are not available. Batteries generally take one of two forms that may be classified as either wet cell batteries or dry cell batteries. Some of the most common types of wet cell batteries used in a rechargeable manner are lead-acid batteries that position a number of lead plates within a bath of sulfuric acid. These types of batteries are frequently used to start automobiles and to provide power for electrical equipment in remote areas where AC power is not available. It is important to be able to recharge these batteries on a rapid and regular basis.

When such batteries are positioned within automobiles and the like, they are recharged by alternators positioned in conjunction with the internal combustion engines of the vehicle. Typically the internal combustion engine drives a generator or alternator by way of a V-belt connection. Electrical cables from the generator or alternator are connected to the battery through a voltage regulator which recharges the battery as needed. For environments where lead-acid batteries are utilized apart from automotive vehicles the ability to recharge the batteries can become problematic. Some type of portable battery charging device that was easy to move from place to place and could rapidly recharge a bank of batteries would be desirable within these environments.

Devices are known in the prior art which constitute electrical battery chargers that are designed and structured to recharge lead-acid batteries, such as those found in automobiles, apart from the internal combustion engine within the automobile. Typically, these battery chargers plug into an AC outlet (115 VAC) and through the appropriate electronics and electrical circuitry provide a slow-charge current at the typical 12 VDC (or more specifically 14+ VDC in order to effect a charge on the battery) to the lead-acid wet cell battery. Such devices are frequently used in automotive garages and the like where it is necessary to recharge a battery without running the internal combustion engine within the vehicle associated with the battery. These battery chargers, because they only require access to an AC electrical outlet, have become quite compact and portable in design. The unfortunate limitation on these devices, however, is of course that an AC outlet must be available.

Wet cell batteries such as the lead-acid batteries described above are commonly used in conjunction with machinery and electrically driven mechanical devices that might be situated far from readily available AC power. Examples of such situations include farms and ranches where irrigation equipment or the like might be operable by electrical power provided by one or more lead-acid batteries. With the appropriate circuitry, a large bank of lead-acid wet cell batteries can be used to power a small low-power living environment in a remote location. The uses for such lead-acid wet cell batteries in remote locations are numerous and yet all depend upon the ability to recharge the batteries through some process other than connection through an AC powered battery charger. It would be desirable therefore to provide a portable means for recharging lead-acid wet cell batteries in remote locations without the need for access to AC power. It would be desirable if such a system could be readily moved to the location of the batteries by a single individual and could rapidly charge the batteries to a condition where they might further be used to power remotely located machinery and the like. It would be desirable if such a system operated off of an internal combustion engine connected through a generator or the like in a manner similar to that associated with automotive battery charging systems. It would be beneficial if such a portable system could take advantage of recent advances in the efficiency of automotive generators and alternators in order to more rapidly charge a large bank of batteries connected in parallel and/or to charge batteries whose acid baths have been nearly or fully depleted.

SUMMARY OF THE INVENTION

The present invention provides a portable battery charger that is powered by a small to moderate sized gasoline, diesel, or propane internal combustion engine. The portable device incorporates a recoil or an electric starter and an engine throttle that can be used to vary the voltage/current output of the charger. The charger uses a generator that includes a permanent magnet alternator equipped with a belt tension adjustor arm, a heavy duty diode rectifier, and a circuit protector. The primary components of the charger (the engine and the generator) are positioned on a wheeled, heavy-gauge steel, roll-around cart that makes the charging system easily portable. The two-wheeled cart includes a gooseneck handle, allowing the user to steer the charger from one point to another. Positioned on this handle is a control box with an anti-spark keyed switch that blocks any discharge or spark from traveling through the charging wires until the switch is turned on. This switch control facilitates the safe hook-up of the charging clamps while the charger (engine) is running. The charging system also includes heavy duty cables between the generator and the anti-spark control box, as well as well as out from the control box to insulated clamps that are used to connect to the batteries for charging. The control box additionally includes an ammeter and a voltmeter to indicate the charging current and voltage. The portable charger structured in this manner can be used to charge a non-specific number of batteries in parallel in less than 2-4 hours depending on the size and state of the existing battery charge. The charger may also be used in the process of equalizing a bank of batteries to facilitate a reduction in stratification and sulfation that often occurs when a group of batteries is charged. The essential elements of the present invention (described generally as an engine-driven battery charger) include; (1) its portability created by the placement of the components of the charger on a wheeled-cart; (2) the use of an internal combustion engine to eliminate the need for access to an AC electrical power outlet (thus enhancing its portability) and to provide a means for adjusting the output voltage/current with an engine throttle; (3) the use of a permanent magnet alternator to improve the efficiency of the charging process; (4) inline ammeter and voltmeter to monitor the charging process; and finally, (5) the use of an anti-spark control box to enhance safe operation and performance.

DETAILED DESCRIPTION OF THE PREFERRED EMBODIMENTS

Figure 1:
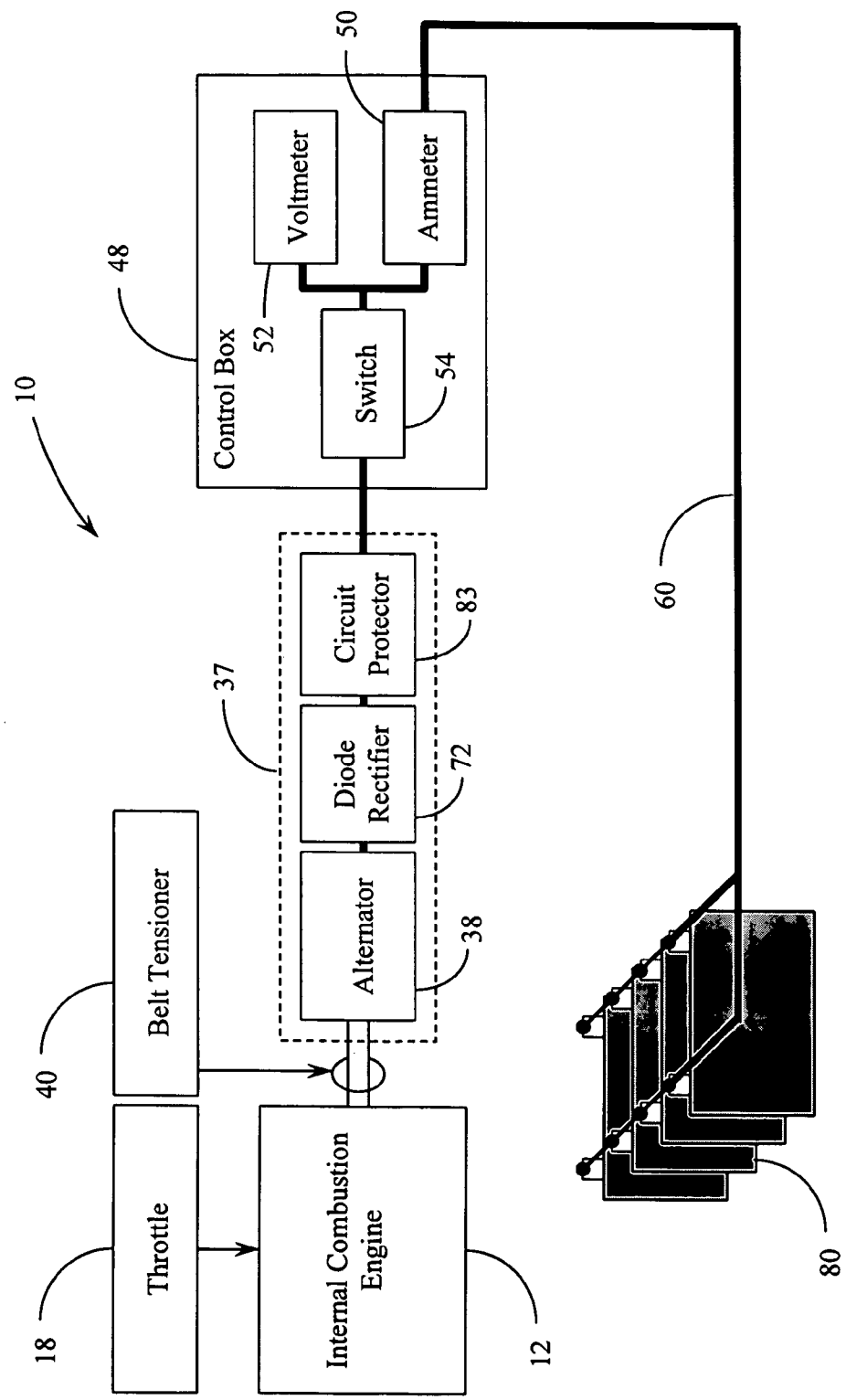
FIG. 1 is a schematic block diagram showing the various components of the present invention and their functional relationship within the charging system.

Reference is first made to FIG. 1, which provides a simple block diagram of the overall structure and function of the battery charging system of the present invention. As shown in FIG. 1, the battery charging process begins with the operation of internal combustion engine 12, being regulated by engine throttle 18 which can be adjusted manually to control the number of RPM's (and therefore the power) that the engine puts out. The power output of the engine 12 is used to turn alternator 38 within the generator system 37, the rotation being transferred to the alternator 38 through the engine's output driveshaft through a V-belt and pulley arrangement described in more detail below. The engine drive pulley is connected to a pulley on the input driveshaft of the alternator 38 with a standard V-belt through a belt tensioner 40, which is used to tighten or loosen the V-belt. The belt tensioner 40 supplements the function of the engine throttle 18 wherein the tightness of the V-belt has a direct effect on the power that is transferred to turning the alternator 38.

Alternator 38 produces the necessary voltage and current to charge the batteries 80. This alternating charging current flows out of the alternator 38 through a heavy-duty diode rectifier used to provide the steady state direct current for the battery charging process. The direct charging current then flows through a circuit protector 83 through fixed, heavy-duty cables 46 which travel from the generator system 37 to anti-spark control box 48. Control box 48 is used for a number of functions, including interrupting the charging current from the alternator 38 to the battery cables unless and until the anti-spark cut-off switch 54 is manually keyed. The control box 48 is important to facilitate a safe and secure hook-up of the charging clamps to the batteries 80 before any charging voltage is seen at the clamps and prevents any chance of the user being shocked or injured by sparks. As with any lead-acid battery charging process, hydrogen gas may be produced as the reversal of the discharge chemical reaction is carried out. Keeping any spark within the system away from the batteries themselves (the location of the hydrogen gas) can be an important safety feature of the system of the present invention.

Along with the anti-spark cut-off switch 54, the control box 48 also includes a voltmeter 52 and ammeter 50 used to monitor the amount of voltage and current, respectively, present within the cables 60 to charge the batteries 80. When the anti-spark switch 54 is initiated to complete the circuit, the charging current flows through a second set of heavy duty cables 60 attached to the control box 48 and on to the battery or batteries 80 to be charged. The targeted batteries 80 can be placed in parallel and charged simultaneously, or they can be charged individually.

Figure 2:
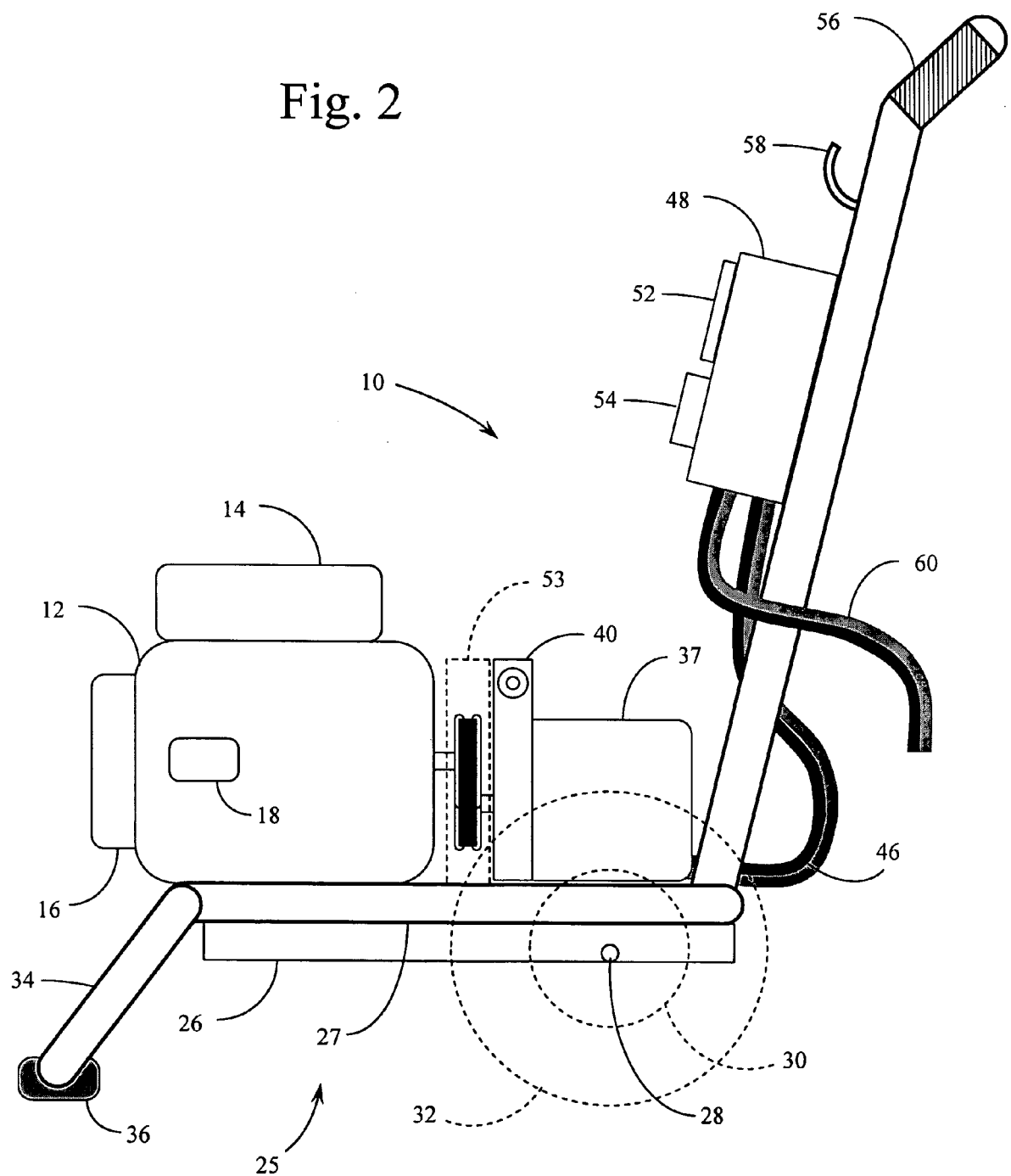
FIG. 2 is a detailed side view of the portable battery charger system of the present invention, showing the physical relationship of the various components contained therein.

Reference is now made to FIG. 2 which discloses in greater detail the overall structure of the charging system 10 of the present invention. FIG. 2 discloses a wheeled cart 25 that supports and transports all of the components associated with the battery charging system 10. The wheeled cart 25 comprises a base 26 supported by an axle 28 with two wheels 30 on either side of the base 26 and, in the preferred embodiment, small inflatable tires 32 positioned on the wheels 30. A frame component 27 extends forward from the base 26 and angles down to form a front support 34 for the wheeled cart 25. A support pad 36 is positioned beneath the front support component 34 to provide a soft contact with the flat surface or ground on which the wheeled cart 25 is positioned. A handle 56 extends up from the base 26 rearward of the position of the axle 28 in a gooseneck shape (in the preferred embodiment) that extends to a height and at an angle appropriate for manipulation by an individual user of the battery charger system 10. Affixed toward the top of the handle 56 neck is a cable hook 58 which is positioned for the user to gather and hang any excess of the charging cable 60 which extends from the control box 48 and would normally be directed to the battery 80 for charging.

Various components of the system 10 are mounted on the base 26 of the wheeled cart 25. Positioned on the base 26 and frame 27 of the wheeled cart 25 are the internal combustion engine 12 and the generator system 37. The generator system 37 includes a high-efficiency, permanent magnetic alternator 38 (shown in greater detail in the schematic of FIG. 4B). The engine 12 in the preferred embodiment comprises a pull starter 16, a fuel tank 14, and a throttle adjustment 18. The internal combustion engine may be fueled by gas, diesel, or propane fuel. The engine pulley attached to the output driveshaft of, and extending rearward from, the engine 12 retains a V-belt which is connected to the alternator pulley through a V-belt and belt tensioner arrangement 40 which, as previously described with reference to FIG. 1, is used to supplement the regulation of the torque transferred from the engine 12 to the alternator 38. A belt guard 53 is used to house the engine pulley, alternator pulley, and V-belt to protect them from debris and to act as a safety guard for the user.

The alternator 38 used in the system of the present invention is preferably a permanent magnet alternator which, in the preferred embodiment, contains a neodymium grade 40 type magnet as described in more detail below. Heavy-duty cables 46 extend from the high-efficiency alternator 38 within the generator system 37 into an anti-spark control box 48 mounted on the upright handle 56. As discussed with respect to FIG. 1, the control box 48 incorporates a cut-off switch 54 positioned to interrupt the charging current flow to the cables 60, as well as an ammeter 50 and a voltmeter 52 which are both used to measure the amount of current and voltage, respectively, available for charging the batteries 80. The electrical/electronic circuitry of this control box 48 is described in more detail below. Charging cables 60 extend from the control box 48 to battery clips or clamps (not shown in FIG. 2) at a remote end of the cables 60. The cable 60 length of 10-25 feet is suitable for the battery charging environments within which the present invention might be used. In the preferred embodiment, both the cables 46 extending from the alternator 38 to the control box 48 and the charging cables 60 which extend from the control box 48 to the charging clamps, enter the under side of the control box 48 in order to prevent moisture from entering the electrical enclosure of the control box. Such an arrangement will allow moisture to drip from the cables rather than leak into the control box 48 or collect at the juncture of the box and cables.

Figure 3:
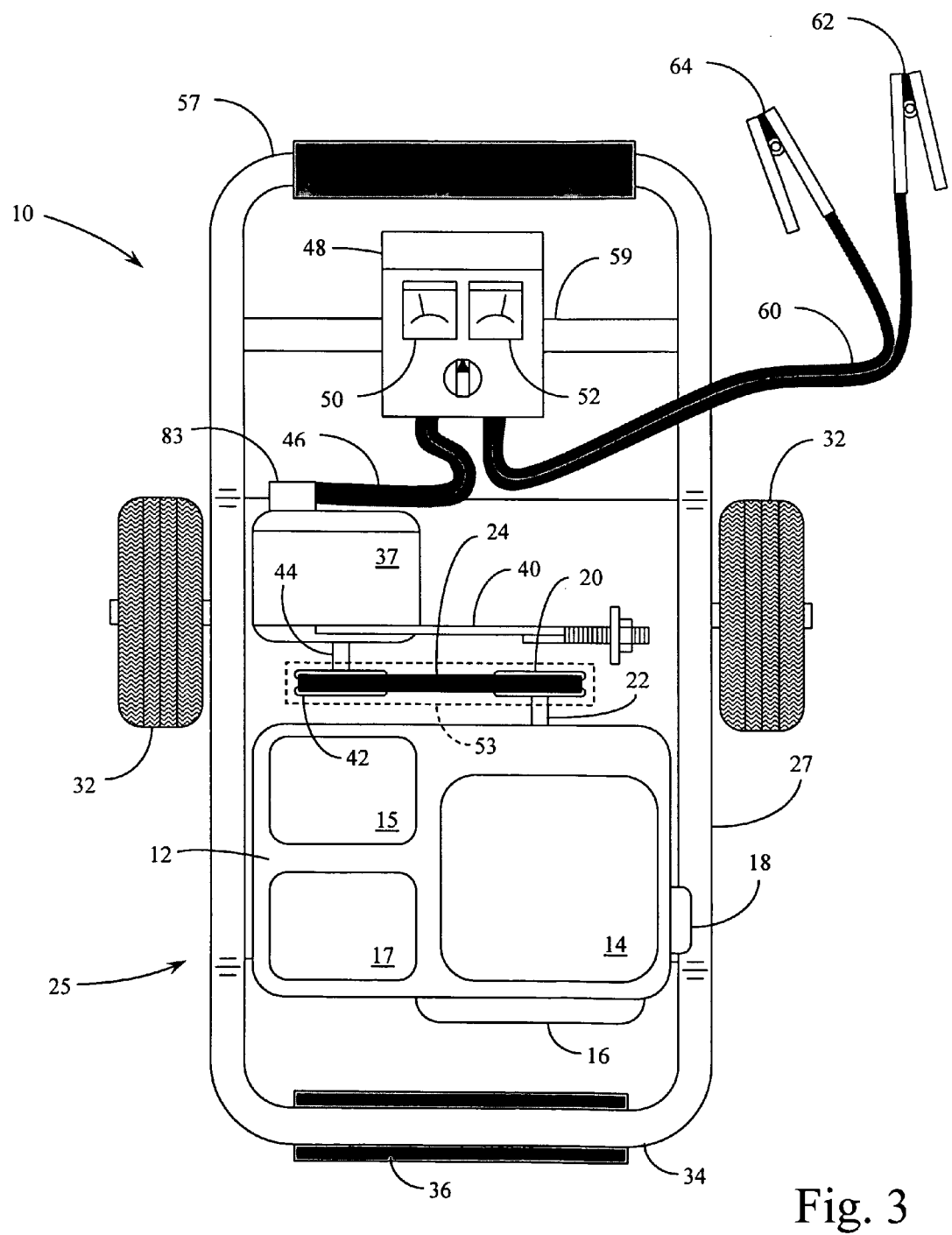
FIG. 3 is a detailed top plan view of the portable battery charger system of the present invention.

In the top view plan shown in FIG. 3, further components of the charging system of the present invention are disclosed. A fuel tank 14 is positioned on top of the internal combustion engine 12 and provides a supply of fuel suitable for use in the type of engine utilized (gasoline, diesel, or propane). Adjacent to the tank 14 is an exhaust muffler 15 and an air-filter/air-intake component 17.

In an alternate embodiment (as shown in FIG. 3), the wheeled cart 25 may be constructed to include a dual rod handle 57 incorporating a crossbar 59 which serves to position and secure the control box 48. It will be understood by those skilled in the art that the specific arrangement of the components on the base of the wheeled cart 27 is not as important as the functional connection between the various components. The specific structures shown in the attached figures lend themselves to each of the adjustments necessary to make the battery charger of the present invention an efficient charging device. Specifically, the belt tensioner 40 shown creates a point of adjustment between the alternator pulley 42, which is situated on the alternator input driveshaft 44, and the engine pulley 20, which is attached to the engine output driveshaft 22. Along with the V-belt 24, both pulleys 20 and 42 are protected by the belt guard 53 referred to in the previous drawing FIG. 2. Likewise, the positioning of the control box 48 on the upright handle 56 provides easy access and easy viewing of the necessary control components of the present invention. The throttle 18 for the internal combustion engine 12, positioned as shown, likewise provides easy access to the user for operation and control of the RPM for the power providing engine 12.

The high-efficiency of the alternator 38 within the generator system 37 is in part the result of the preferred use of neodymium grade 40 type permanent magnet used in association with the rotor of the system, although other varieties of rotors could be used. The stator of the system is a 60-150 amp stator (in the preferred embodiment) which may be housed in a Delco® 1051 or 1251 type alternator frame. A heavy-duty diode rectifier 72 is positioned in association with the output of the alternator. The alternator 38 output is passed through the heavy-duty diode rectifier 72 to provide the steady state direct current required to charge the batteries 80 as indicated in detail above. As earlier stated with respect to FIG. 1, this charging current then passes through the heavy-duty cables 46 via a circuit protector 83. The circuit protector 83 prevents damage to the rectifier and alternator from a reverse current that could result if the charging clamps 62 and 64 are connected to the batteries 80 in reverse polarity. In the preferred embodiment this circuit protector 83 is a re-settable circuit breaker device.

Figure 4B:
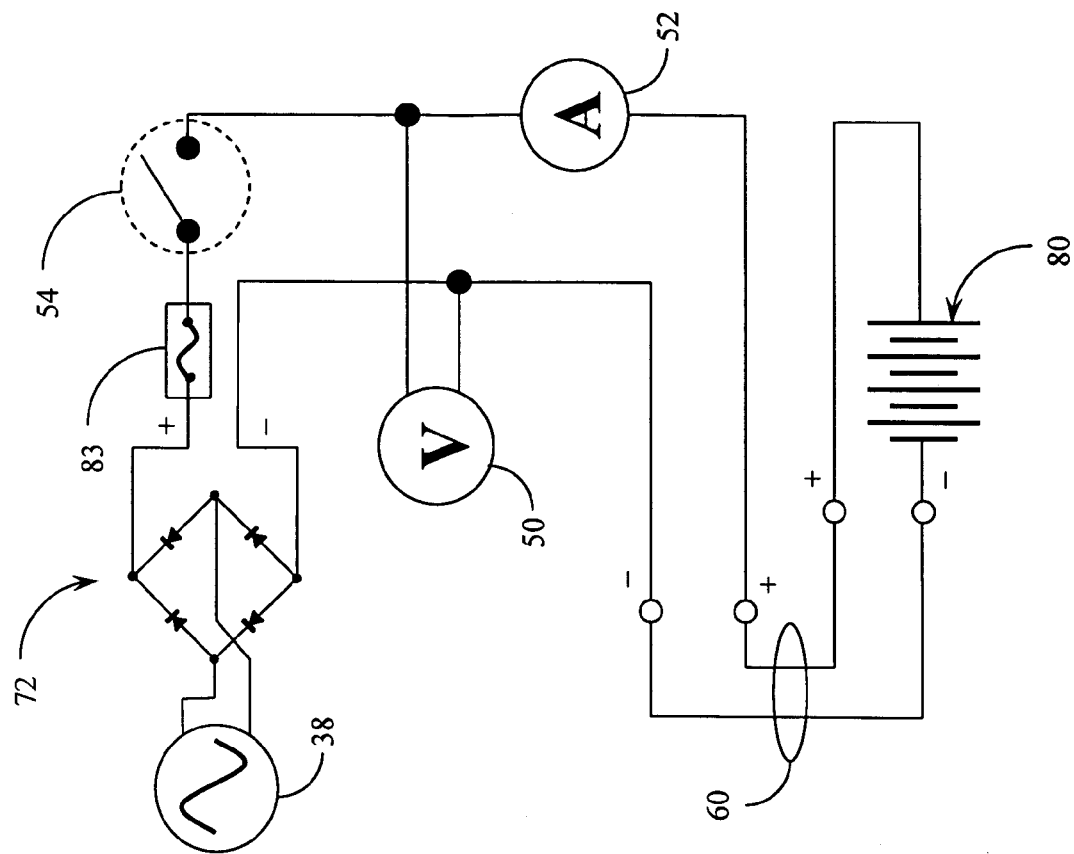
FIG. 4B is an electronic schematic of the basic electrical/electronic components of the system of the present invention.
Figure 4A:
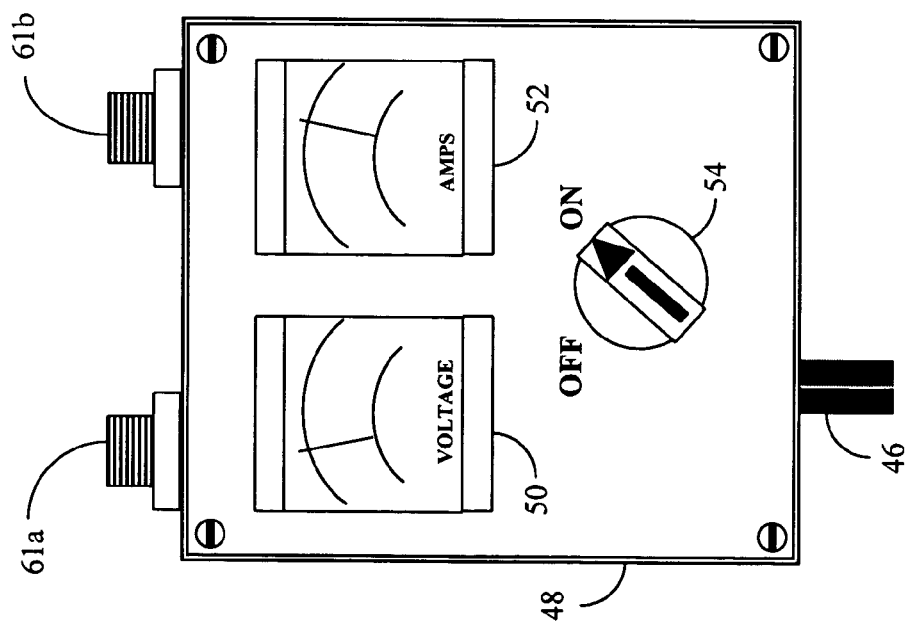
FIG. 4A is a detailed front view of the control component of the system of the present invention.

Reference is now made to FIG. 4A for a detailed front view of the control component enclosure 48 of the system of the present invention. In this view the arrangement of the keyed cut-off switch 54 as well as the ammeter 52 and voltmeter 50 is shown. The control box 48 is preferably an airtight enclosure that resists the presence of external gas (hydrogen from the battery charging process) at the contact points for the internal switch. In the alternate embodiment shown here, the control box 48 include two conductor post contacts 61a and 61b positioned to allow the use of standard jumper cables as charging cables in the place of cables 60 discussed in the preferred embodiment above. In such an arrangement, only the cable 46 from the generator system enters control box 48 from below as shown. Keyed switch 54 is shown providing an on-off function by connecting or disconnecting the positive (+) conductor of the system from the output to the batteries. Switch 54 is designed to be turned (on or off) only upon insertion of a key therein as is know in the art.

Reference is finally made to FIG. 4B which is a schematic circuit diagram of the electrical/electronic components of the system of the present invention. In this view, alternating current is directed from the alternator 38 through to the diode rectifier 72 and thereafter through circuit protector 83 (on the positive conductor side of the circuit). The charging current is then connected through switch 54 and ammeter 50 positioned within the control box enclosure as described above. Removable cables 60 connect the DC output to the bank of batteries 80. Voltmeter 52 is connected across the conductors (within the control box) to provide an indication of the voltage present at the output of the control box circuitry (and therefore the state of the keyed cut-off switch 54).

Although the present invention has been described in terms of the foregoing preferred embodiments, this description has been provided by way of explanation only, and is not intended to be construed as a limitation of the invention. Those skilled in the art will recognize modifications of the present invention that might accommodate specific engine fuels, specific charging connectors, and specific target batteries being charged. Such modifications as to size, geometry, and even system configuration, where such modifications are merely coincidental to the specific application, do not necessarily depart from the spirit and scope of the invention.

I claim:

1. A portable battery charger used to charge at least one lead-acid wet-cell battery, the portable battery charger comprising:
    an internal combustion engine having an output drive shaft;
    a generator comprising a permanent magnet alternator and a heavy-duty diode rectifier, the generator having an input drive shaft operably connected to the output drive shaft of the internal combustion engine;
    a wheeled cart having a support frame and a handle for manipulation by the user;
    an anti-spark control box positioned on the handle of the wheeled cart for controlling charging current flow, the control box electrically connected to an output of the generator; and
    a pair of electrical connectors for conducting charging current from the control box to the at least one battery;
    wherein the generator and the internal combustion engine are positioned on the support frame of the wheeled cart.

2. The portable battery charger of claim 1, wherein the engine further comprises an engine throttle adjustment to vary the RPM of the engine and thereby adjust the generator output voltage and current.

3. The portable battery charger of claim 1, wherein the internal combustion engine comprises a fuel tank and the engine operate on a fuel selected from the group of fuels that include gasoline, diesel, and propane fuel.

4. The portable battery charger of claim 1, wherein the output drive shaft of the engine further comprises an engine pulley and the input drive shaft of the alternator further comprises an alternator pulley, and wherein a V-belt connects the alternator pulley with the engine pulley.

5. The portable battery charger of claim 4, further comprising a belt tensioner for varying a transfer of torque between the engine and the alternator.

6. The portable battery charger of claim 1, wherein the alternator further comprises a permanent magnet rotor.

7. The portable battery charger of claim 1, wherein the handle of the wheeled cart comprises a rigid member extending to a height and at an angle appropriate for manipulation by a user of the portable battery charger.

8. The portable battery charger of claim 7, wherein the handle comprises a single rigid tube having a gooseneck shape.

9. The portable battery charger of claim 7, wherein the handle comprises a dual rigid tube having an inverted U-shape, and further comprising a cross-member element for positioning and supporting the control box.

10. The portable battery charger of claim 7, wherein the handle further comprises a cable hook affixed to said handle.

11. The portable battery charger of claim 1, wherein the wheeled cart comprises two rear wheels and a front support member, wherein the front support member facilitates the stationary placement of the portable battery charger when the charger is in use.

12. The portable battery charger of claim 11, wherein the front support member further comprises a support pad positioned beneath and affixed thereto, the support pad preventing easy movement of the wheeled cart on a flat support surface.

13. The portable battery charger of claim 1, wherein the control box further comprises a cut-off switch for interrupting a conductive path from the generator to the batteries.

14. The portable battery charger of claim 1, wherein the control box further comprises an ammeter for monitoring the charging current during the process of charging the batteries.

15. The portable battery charger of claim 1, wherein the control box further comprises a voltmeter for monitoring the charging voltage during the process of charging the batteries.

16. The portable battery charger of claim 1, wherein said pair of electrical connectors comprises a pair of heavy duty cable conductors, each of the conductors terminating with a spring biased battery clamp for attachment to terminal posts of the batteries to be charged.

17. The portable battery charger of claim 1, wherein said pair of electrical connectors comprise contact electrodes attached to said control box to which a standard set of jumper cables may be attached.

* * * * *